Nov. 10, 1953  D. LABINO  2,658,848
METHOD FOR MAKING GLASS PAPER
Filed Nov. 17, 1951
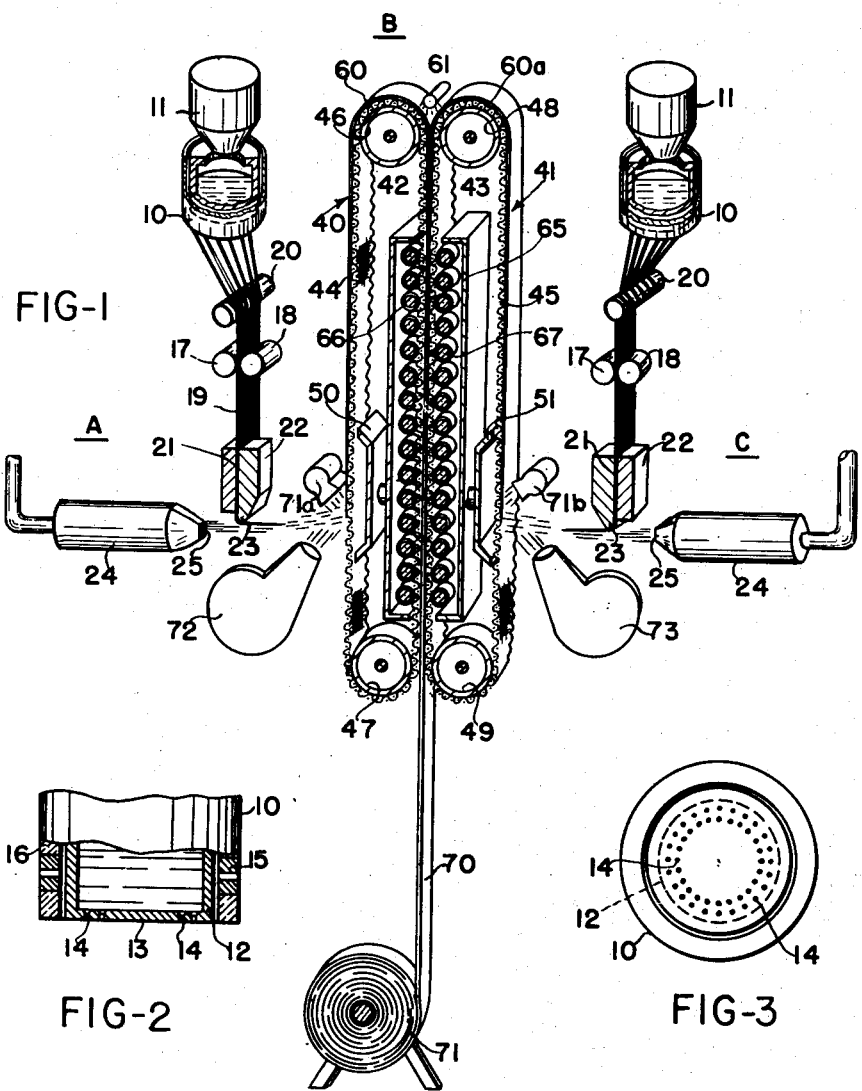
INVENTOR
DOMINICK LABINO
BY Toulmin & Toulmin
ATTORNEYS

UNITED STATES PATENT OFFICE 2,658,848

METHOD FOR MAKING GLASS PAPER

Dominick Labino, Waterville, Ohio, assignor to Glass Fibers, Inc., Toledo, Ohio, a corporation of Ohio Application November 17, 1951, Serial No. 256,930

2 Claims. (Cl. 154—101)

This invention relates to methods and apparatus for producing as a new article of manufacture a glass paper.

Paper consisting of glass fiber has heretofore been unknown in the art. Attempts made to produce glass paper have resulted in failure except as disclosed in my co-pending application 247,010, filed September 17, 1951, because of the lack of any tensile strength in the material produced which rendered it useless as a paper in the many uses to which paper is adapted. Further, the material produced lacked surface finish and hardness, making it unsuitable for use as paper.

However, I have discovered that fine glass fibers of uniform diameter, on the order of one micron and less, mat or felt together with self-adhesion to an extent that good tensile strength is imparted to the product produced and that a smooth, hard surface finish can be given to the material, thereby making it satisfactory for use as paper. With the glass fibers having uniformity of diameter and uniformity of length, extreme uniformity of the paper is obtained.

Paper made of glass fibers according to this invention has characteristics that are not capable of reproduction in papers made from natural fibers, thus making glass paper adaptable for special purpose applications in which papers made from natural fibers cannot be used. For example, electronic components in which insulating papers are used are limited to a top temperature value of about 85° C., principally because of the destruction of the paper base of the component under heat. Thus, a paper made of glass fibers will permit of higher temperature elevation of electronic components because the basic fiber does not deteriorate at low temperature.

Glass paper also has a very low coefficient of expansion which eliminates difficulties resulting from expansion and contraction and since the glass fibers are non-hydroscopic, there is no change in dimensional size resulting from changes in moisture content of the paper. These characteristics are useful in the printing industry. Also, with the glass paper having a hard smooth surface, it is capable of receiving writing and printing.

Attempts at making papers from other synthetic fibers have resulted in products unsuitable for many uses to which paper is adapted as the synthetic fibers have required bonding, either by plasticizing the fibers slightly, or bonding has been obtained by the use of synthetic binders. Papers of this nature, however, are still highly susceptible to deterioration by heat or the bonding agent introduces a foreign substance into the paper which is subject to deterioration or makes it undesirable for use in special applications. The bonding together of smooth surfaced synthetic fibers has, therefore, been a substantial problem in any attempt to produce a true paper from fibers other than natural fibers.

It has been discovered, however, that when glass fibers are produced with diameters such that they approach dimensions of particles of collodial suspensions, that the glass fibers when placed in a thin mat exhibit characteristics entirely different from those exhibited by glass fibers of larger diameter when placed in mat form. That is to say, that when glass fibers having a diameter of about one micron or less are arranged in a thin mat form, the fibers exhibit felting or matting characteristics and characteristics of surface adhesion that result in a physical interlocking of the fibers together to an extent that a matted or felted web of such glass fibers exhibits substantial tensile strength. This is probably brought about because of the great surface area to weight ratio of the extremely fine glass fibers. The surface area of such fine fibers in a web of any density is so great that there is an actual surface adhesion between the fibers. Also, this result is occasioned because of the diameter to length ratio of the fibers wherein the length of the fiber is 500 to 1000 times the diameter resulting in extreme flexibility of the fiber which permits it to mechanically interlock with the other fibers of like diameter and length.

Also, unlike natural fibers, glass fibers, when properly manufactured, are given the characteristics of uniform diameter and substantially uniform length. Thus a paper made from glass fiber of uniform diameter, and if desired, of uniform length, exhibits uniform physical, electrical and chemical characteristics as distinguished from non-uniform characteristics of paper made from natural fibers because of the varying diameter and length of the natural fibers.

It is, therefore, an object of this invention to provide a method and apparatus for producing paper from glass fibers, and particularly to produce paper having good tensile strength and which will have uniform physical, electrical and chemical characteristics.

It is another object of the invention to provide a method and apparatus for producing glass paper of the kind referred to in the foregoing object wherein the paper is composed of glass fibers having a diameter of substantially one micron or less wherein the fiber diameters approach uniformity and wherein, if desired, the length of the fibers also approach uniformity.

It is a further object of the invention to provide a method of making glass paper wherein glass fibers having a diameter of substantially one micron or less are used and the diameter of the glass fibers is held within a range of 0.1 to 1.0 micron.

It is still another object of the invention to provide a method of making a glass paper having a low density as compared with comparable paper made from natural fibers but having a high tensile strength.

It is another object of the invention to provide a method of making a glass paper wherein the finish of the paper is the same on both sides.

It is another object of the invention to provide a method of making a glass paper wherein the paper is constructed of two mats or webs of glass fiber brought together and interfelted at their adjacent faces to form a single composite web.

It is another object of the invention to provide a method of making a glass paper in accordance with the preceding object wherein the mats or webs of glass fibers are interfelted as they are brought together by wetting the mats or webs on the adjacent faces being brought together whereby to cause the interfelting of the glass fibers in the adjacent faces of the webs or mats or producing a single composite structure.

Further objects and advantages will become apparent from the drawings and the following description.

In the drawings:

Figure 1 is a diagrammatic illustration of apparatus on which the method of making glass paper of this invention is performed.

Figure 2 is a cross-sectional view of the melting and heating chamber from which the primary glass fibers are produced.

Figure 3 is a bottom view of the device of Figure 2.

In the manufacture of paper from natural fibers, such as those from the various celluloses, it is recognized in the art that a wide variation in quality of a paper product results from the unpredictable variations in natural fibers. Thus, quality control of papers made from natural fibers is one of the major factors that must be constantly watched and regulated during production of paper. This is particularly true in the production of papers for special applications where uniform quality and physical characteristics of the paper must be carefully retained so as to secure as nearly as possible uniform characteristics in the products in which the paper is used. One such example is paper products for the electronics industry wherein the uniformity of quality of the paper, such as dielectric property, is a major factor in determining whether the electrical components using the paper will have uniform electrical characteristics. There are, of course, many other applications in which uniform quality control of paper is a major factor.

Because of the wide variation in the diameter and length of natural fibers, and because of the inherent natural variation of the fibers themselves, a wide variation in quality of the paper made from such fibers results, such as in physical, chemical and electrical characteristics. The variations in the paper are carried into the electrical components, for example, in which the paper is used, and there is no satisfactory way to overcome the inherent natural variations in the characteristics of the paper made from natural fibers.

A paper made from fibers having uniform diameter and length is capable of exhibiting uniform physical, chemical and electrical characteristics. Such a paper is that which can be made from glass fibers according to this invention, the glass fibers having uniform diameter of substantially one micron or less. In any paper made from such glass fibers, the micron diameter size of the fiber from which the paper is made is preestablished and the variation from the established micron size is not permitted to vary more than ±.45 micron. Thus, there is established a uniformity of diameter of the glass fibers that has heretofore been unobtainable in synthetic fibers of any kind, including glass fibers.

In the method of this invention glass fibers having a diameter of substantially one micron or less are produced under controlled conditions such that the fiber diameter does not vary more than ±.45 micron from an established micron size. Also, the length of the glass fiber may be held to uniform length if desired. Hence, glass paper made from such fiber exhibits highly uniform physical, chemical and electrical characteristics, such as tensile strength, chemical resistance and dielectric properties.

Thus, as a filtering media, paper made of glass fibers having uniform diameter of micron size or less is superior to filter media made from natural fiber because of the uniformity of the interstices between the glass fibers. Because of the smallness of the interstices between the glass fibers, an extremely efficient filtering media is produced, in fact one that filters smoke from the air.

The glass paper made according to this invention is highly absorbent to liquid and as a result can be saturated with various resins to give to the paper special physical or electrical properties. In fact, such papers have demonstrated their ability to take up as much as twenty-one times their own weight of the saturating solution.

It has been discovered that glass fibers having a diameter of about one micron or less disperse uniformly in a fluid carrier, either air or liquid, and when in the liquid, they are much the same as a colloidal solution. Thus, a fluid carrier containing glass fibers of a diameter of one micron or less is homogeneous in nature so that the fibers can be separated from the fluid in a uniform homogeneous mass with resultant uniformity of density of the collected mass of glass fibers.

If the uniformity of diameter of glass fibers is not retained with the ±.45 micron range, the paper resulting from use of such non-uniform fibers exhibits the same objectionable variations in physical, chemical and electrical characteristics as that exhibited in papers made from natural fibers. Hence, uniformity of diameter of the glass fibers is of critical importance in the manufacture of a glass paper having uniform physical, chemical and electrical characteristics. Preferably also, the glass fibers shall be substantially of the same length.

Glass fibers having a diameter of one micron or less when incorporated into a paper exhibit the characteristic of self-adhesion, even though the surface of the glass fibers is entirely smooth, resulting in a glass paper having substantial tensile strength. This self-adhesion of the glass fibers is occasioned merely by wetting the fiber with water and collecting the wet fiber as a web or sheet, or the fiber can be collected in dry form and thereafter wet with water. No binder whatever is necessary to secure the self-adhesion of the glass fibers. A paper made from water wet fibers exhibits good tensile strength and uniformity of structure.

The self-adhesion is greatly increased by wetting the fiber with an acid water. It has been discovered that each glass of a different glass composition and a different alkaline content has a critical pH value of the water with which it works best. The effect of the correct pH value of the water made acid by any of the common acids, such as hydrochloric and sulphuric for example, is that of obtaining a much greater and a more even dispersion of the glass fiber in the water. The effect is much the same as would be occasioned by the use of a greatly increased quantity of water to disperse the same amount of glass fiber. Also, a more uniform dispersion is obtained to an extent that less bunching of the fibers occurs in the water and the fibers seem to repel one another whereby each fiber is separately dispersed in the water.

It has been discovered that as the alkaline content of the glass is lowered, the acidity of the water in which the glass is dispersed must be increased. Fibers made from a high alkaline glass disperse readily in an acid water having a pH value of about 6.0, whereas the fiber made from a low alkaline glass disperses in the water only when the pH value of the water is reduced to a value in the neighborhood of 2.0. Thus the acid content of the water is inversely proportional to the alkaline content of the glass, all as more fully disclosed and described in my co-pending application Serial Number 247,010.

To obtain glass fibers of a uniform diameter of one micron or less and retain the diameter of the fibers within a range of ±.45 micron, the conditions under which the glass fibers are produced are critical to the extent that conditions once established must thereafter be maintained constant to hold the sub-micron diameter of the fiber constant. The glass fiber is of the class known as staple fiber, but the diameter to length ratio is exceedingly high with the sub-micron diameter of the fiber providing for extreme flexibility and mechanical strength of the fiber.

In Figures 1, 2 and 3 there is illustrated an apparatus for obtaining glass fibers of one micron in diameter or less and for producing paper from such fiber. In Figure 1 there is illustrated a heating and melting chamber 10 into which glass marbles are fed from a supply hopper 11. The glass marbles are fed into the heating and melting chamber 10 at periodic intervals governed by the rate of removal of glass from the heating and melting chamber. Since the marbles are approximately ½" in diameter and the heating and melting chamber 10 is approximately 5" in diameter, with the molten glass mass about 2.5" deep, the level of molten glass in the heating and melting chamber is maintained at a constant level since the small amount of glass added by the dropping of a marble into the body of molten glass in the heating and melting chamber is insufficient to cause any noticeable effect on the level of the molten glass in view of the small volume of the marble relative to the volume of the molten glass in the heating and melting chamber.

The heating and melting chamber 10 is more particularly illustrated in Figure 2 wherein it is illustrated as consisting of an inner metal chamber 12 that is circular or cylindrical in shape. The chamber 12 is preferably constructed of platinum to resist the action of the molten glass contained within the chamber.

The bottom wall 13 of the chamber 12 contains a plurality of openings 14 through which molten glass exudes from the chamber 12. These openings 14 are arranged in circular rows near the periphery of the chamber 12 as illustrated in Figure 3. A heating coil 15 is placed around the exterior of the chamber 12 and is adapted for connection to a source of high frequency energy which may, for example, be an electronic high frequency oscillator, or a high frequency generator. The heating coil 15 is placed substantially at the glass melting level of the molten glass in the chamber 12 to effect uniform heating conditions throughout the body of the molten glass in the heating chamber or pot 10. The heating chamber 12 is preferably surrounded with a ceramic heat insulating material 16 to conserve heat therein.

It has been determined over a long period of experimentation and manufacture of glass fibers that the heating of glass by the use of a high frequency current in a heating coil that is placed around a circular heating chamber and positioned uniformly around the chamber results in obtaining absolute uniformity of viscosity of the molten glass throughout its entire mass within the heating chamber.

With the level of the molten glass maintained constant within the heating chamber 12 and with the viscosity of the molten glass absolutely uniform throughout the entire mass thereof, there is effected identically the same head of glass above each opening 14 in the bottom wall of the heating chamber 12 at a viscosity of exactly the same as that which occurs in the head of glass above every other opening in the bottom wall of the heating chamber. The head of glass above each of the openings is exactly the same because of the parallel placement of the bottom wall of the heating chamber relative to the level of molten glass therein. As a result, exactly the same quantity of molten glass is exuded through each of the openings 14 from the heating chamber 12.

The head of glass above the openings 14 establishes a uniform pressure differential between opposite sides of the body of the glass to cause the glass to exude through each of the openings at a constant rate in constant volume. However, a positive pressure can be established above the body of molten glass in the chamber 12 should it be desirable to obtain a flow rate of the molten glass through the openings 14 greater than that occasioned by the normal head.

The streams of molten glass from the chamber 12 cool quickly so that solidified glass fibers can be passed between the drawing rolls 17 and 18 for drawing of the molten glass as it leaves the chamber 12 into the fine fibers that pass between the drawing rolls 17 and 18. The glass fibers 19 pass over a guide 20 having a recess to receive each of the fibers whereby the fibers are arranged in planar relationship for entry to between the drawing rolls 17 and 18. The drawing rolls are preferably of a rubber-like material to frictionally engage the glass fibers 19 whereby to pull them downwardly from the heating chamber 12.

The drawing rolls 17 and 18 are driven by a suitable mechanical apparatus to rotate them at constant speed which is controlled to establish the diameter of the drawn glass fiber 19 at a predetermined and fixed value, for example, 0.005 to 0.007 inch.

With the flow of molten glass from the heating chamber 12 being at a uniform controlled rate from each of the openings 14, and with the drawing rolls 17 and 18 simultaneously drawing each of the molten strands into glass fiber from molten glass of exactly the same viscosity flowing at exactly the same rate, the drawn diameter of each of the primary glass fibers 19 will be exactly the same within but very minor limits of .0005 inch.

The primary glass fibers 19 are advanced by the drawing rolls 17 and 18 over the flat face 21 of a guide block 22 having a V-shaped edge 23.

In horizontal alignment with the V-shaped edge 23, there is provided a gas burner 24 that has a horizontal discharge slot 25 through which a high temperature high velocity gas blast is discharged directly at the ends of the glass fibers 19 below the edge 23 of the block 22. The high temperature gas blast melts the ends of the fibers 19 and the high velocity of the blast causes the molten glass from each of the fibers 19 to be blown from the end of the fiber and simultaneously therewith drawn into a glass fiber of extremely fine diameter of one micron or less.

With the primary glass fibers 19 having a diameter of from 0.002 to 0.007 inch, and with the high temperature high velocity gas blast having a temperature of 3300° F. or higher and a velocity of 1600–2000 ft./sec., glass fibers of 0.04 to 1.0 micron in diameter are produced.

By controlling the diameter of the primary glass fiber 19, the rate of feed, temperature and velocity of the burner gas at discharge slot 25, the diameter of the drawn staple fiber can be varied.

With the primary glass fibers 19 being fed uniformly into a burner blast of uniform temperature and velocity, the ends of the primary glass fibers are all rendered molten at the same rate with the result that the staple fiber blown from the ends of the primary glass fibers is of relatively uniform length, as well as being uniform in diameter.

Thus, under controlled conditions, staple fiber having a diameter of one micron or less can be obtained with controlled uniformity of diameter and length of the staple fiber.

The apparatus just described comprises a glass fiber forming unit "A" that is placed at one side of the paper forming unit "B." A similar glass fiber forming unit "C" is placed at the opposite side of the paper forming unit "B". Thus, the glass fiber forming units "A" and "C" simultaneously deposit glass fiber of one micron or less on the paper forming unit "B," and from opposite sides thereof.

The paper forming unit "B" consists of a pair of endless wire fabric belts 40 and 41. The belts have adjacent co-extensive runs 42 and 43 and have outer runs 44 and 45 respectively. The belt 40 is carried between cylinders 46 and 47 either of which may be suitably driven, while the belt 41 is carried between the cylinders 48 and 49 either of which may also be driven. The belts 40 and 41 are driven at the same linear speed whereby the adjacent co-extensive runs 42 and 43 of the belts move together between the corresponding drive cylinders.

Glass fiber formed by the fiber forming unit "A" is deposited on the outer run 44 of the belt 40 while the glass fiber from the fiber forming unit "C" is deposited on the outer run 45 of the belt 41. The outer runs 44 and 45 of the wire fabric belts both move upwardly as viewed in Figure 1.

By moving the belts 40 and 41 at a predetermined speed, glass fiber is deposited on the belts by the units "A" and "C" in a uniform layer of predetermined thickness. Suction chambers 50 and 51 are provided adjacent the outer runs 44 and 45 of the belts in the area of the deposition of the fibers on the belts to secure more even distribution of the fiber on the belts.

The webs of glass fiber deposited on the belts 40 and 41 are in a relatively loose and fluffy condition at the exposed face of each of the webs, whereas the face of the webs that engage the belts 40 and 41 are a relatively dense smooth face as occasioned by the deposition of the fiber on the belts that are of a fine mesh.

The loose fiber faces of the webs 60 and 60a, that is the outer exposed faces of the webs, are brought together as the webs pass over the upper cylinders 46 and 48. At the juncture of the webs 60 and 60a they are wet with a liquid from a spray head 61. The liquid used may be either water or a suitable resin.

With the loose fibers of the faces of the webs that are brought together wet at the juncture of the faces, the loose fibers of the webs interfelt into a composite single web that then passes downwardly between the adjacent co-extensive runs 42 and 43 of the belts 40 and 41.

As the composite web moves downwardly between the runs 42 and 43 of the wire fabric belts, the web is carried into a heating chamber 65 that is provided with any suitable heating means. Within the heating chamber 65 there is provided a series of rolls 66 against the run 42 of the belt 40 and the corresponding series of rolls 67 against the run 43 of the belt 41. These rolls 66 and 67 retain the runs 42 and 43 of the wire fabric belts in predetermined space relationship to compress the web carried between the runs of the belts and establish a web of predetermined thickness discharging from the heating chamber 65 as a dry web which is then usable as paper.

The finished web 70 is wound into a supply roll 71.

If desired, the glass fibers deposited from the fiber forming units "A" and "C" can be moistened with a suitable liquid as they are deposited on the wire fabric belts 40 and 41 from the spray heads 71a and 71b. This provides means for placing additive agents into glass paper formed on the apparatus, or if desired only water may be sprayed onto the fibers to condense them at this time.

Also, other fiber than glass fiber can be added into the paper at the time of forming the webs 60 and 60a upon depositing the fiber on the belts 40 and 41 simultaneously with the deposition of the glass fibers. The additive fibers can be introduced through suitable blowers 72 and 73.

While the invention disclosed and described herein constitutes a preferred arrangement of apparatus and method of operating the same, yet

I claim:

1. A method of making glass paper that includes the steps of (a) establishing at least a pair of independent webs of glass fibers, said webs consisting of glass fibers of substantially uniform diameter and which range in diameter between about 0.04 and 1 micron and varying not more than about ±0.45 micron, said webs each having an exposed face of glass fiber in relatively loose and fluffy condition, (b) moving said webs along to bring the corresponding exposed faces of each pair of webs together, and (c) applying a wetting liquid onto at least one of said pair of glass fiber webs while said webs are moving into coincidence to interfelt said fibers at the said contacting faces and form a single composite web of paper.

2. A method of making glass paper that includes the steps of (a) establishing at least a pair of independent webs of glass fibers, said webs consisting of glass fibers of substantially uniform diameter and which range in diameter between about 0.04 and 1 micron and varying not more than about ±0.45 micron, said webs each having an exposed face of glass fiber in relatively loose and fluffy condition, (b) moving said webs along to bring the corresponding exposed faces of each web together, and (c) applying a wetting liquid to at least one of said pair of webs as they are moved along, and (d) thereafter heating the webs to dry the same and produce a single composite web of paper.

DOMINICK LABINO.

References Cited in the file of this patent

UNITED STATES PATENTS

| Number | Name | Date |
| --- | --- | --- |
| 2,188,373 | Pearce | Jan. 30, 1940 |
| 2,382,290 | Callander | Aug. 14, 1945 |
| 2,489,242 | Slayter et al. | Nov. 22, 1949 |
| 2,491,761 | Parker et al. | Dec. 20, 1949 |
| 2,564,882 | Cubberley et al. | Aug. 21, 1951 |
| 2,571,334 | Browne | Oct. 16, 1951 |